United States Patent [19]

Fletcher

[11] 4,445,448
[45] May 1, 1984

[54] APPARATUS FOR DELIVERING DISK-LIKE OBJECTS TO AN ATTACHING STATION

[75] Inventor: Roy W. Fletcher, Riverdale, Ill.

[73] Assignee: Union Special Corporation, Chicago, Ill.

[21] Appl. No.: 336,158

[22] Filed: Dec. 31, 1981

[51] Int. Cl.³ .................................................. D05B 3/14
[52] U.S. Cl. ..................................... 112/110; 112/113; 112/104
[58] Field of Search ..................... 112/113, 104, 110; 221/194.1 K, 267, 209, 268; 193/38

[56] References Cited

U.S. PATENT DOCUMENTS

| | | | |
|---|---|---|---|
| 194,005 | 2/1877 | Sherwood | 112/113 |
| 336,881 | 2/1886 | Mathison | 221/209 |
| 1,181,228 | 5/1916 | Kiewicz | 221/184 |
| 1,647,180 | 11/1927 | Kindrat | 221/194.1 K |
| 3,089,443 | 5/1963 | Halbreich | 193/38 |
| 3,565,285 | 2/1971 | Asnes | 221/267 |
| 3,712,253 | 1/1973 | Asnes | 112/113 |
| 3,807,328 | 4/1974 | Lombardo | 112/113 |
| 3,837,530 | 9/1974 | Snyder | 221/268 |
| 4,050,392 | 9/1977 | Taddicken | 112/113 |
| 4,069,777 | 1/1978 | Ishikawa | 112/113 |

FOREIGN PATENT DOCUMENTS 592355  5/1959  Italy .................................... 112/113

*Primary Examiner*—Ronald Feldbaum
*Attorney, Agent, or Firm*—John W. Harbst; John A. Schaerli

[57] ABSTRACT

This disclosure relates to an improvement to spring type flexible chutes provided for delivering disk-like objects from a supply source to an attaching machine. The improvement includes a resilient, elongated spacer which may be inserted into the guideway of the chute for changing the space constraints thereof to maintain a uniform planar orientation of the disk-like objects between the supply source and the machine whereby allowing one chute to be used for multiple purposes.

10 Claims, 3 Drawing Figures

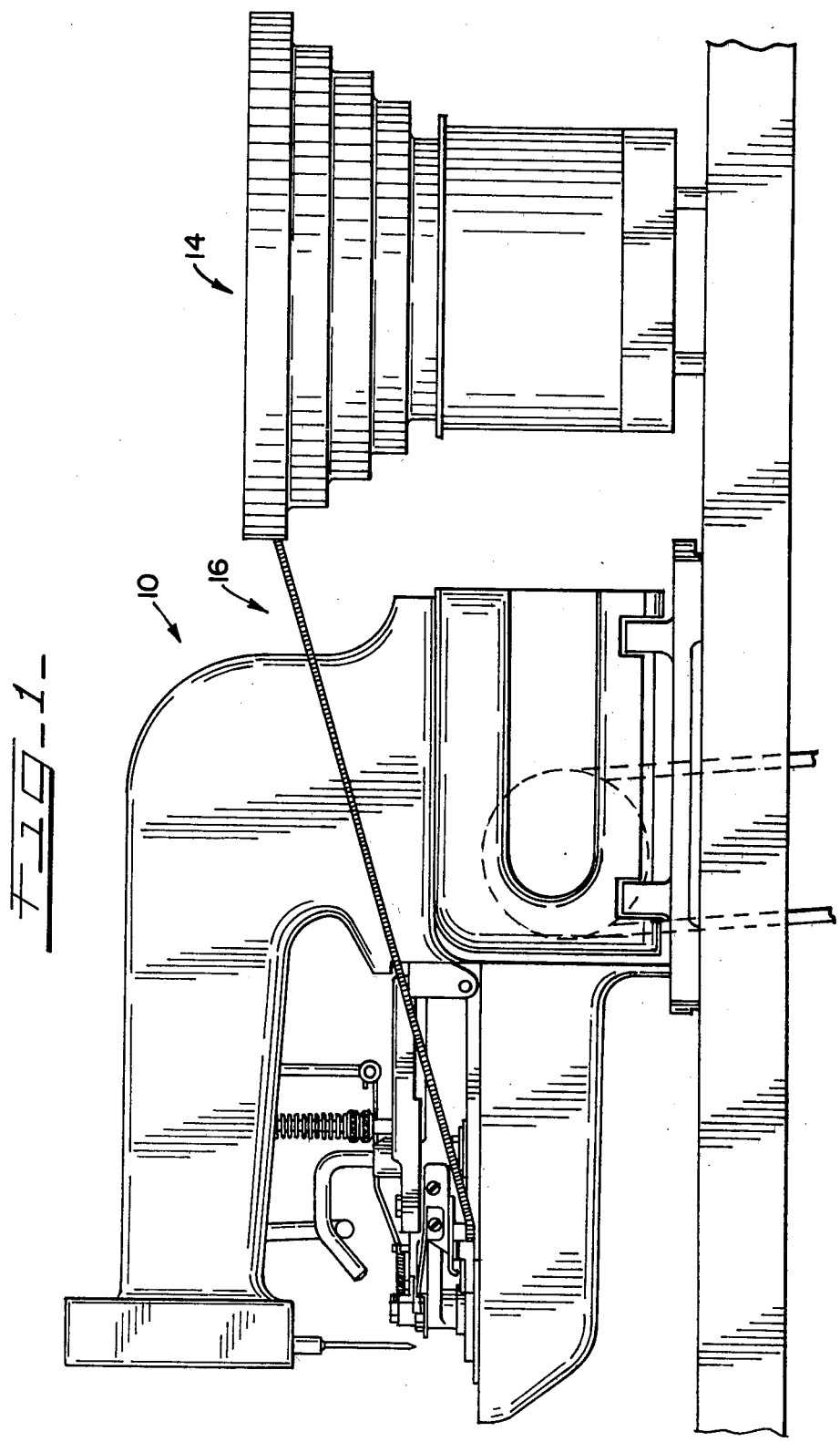

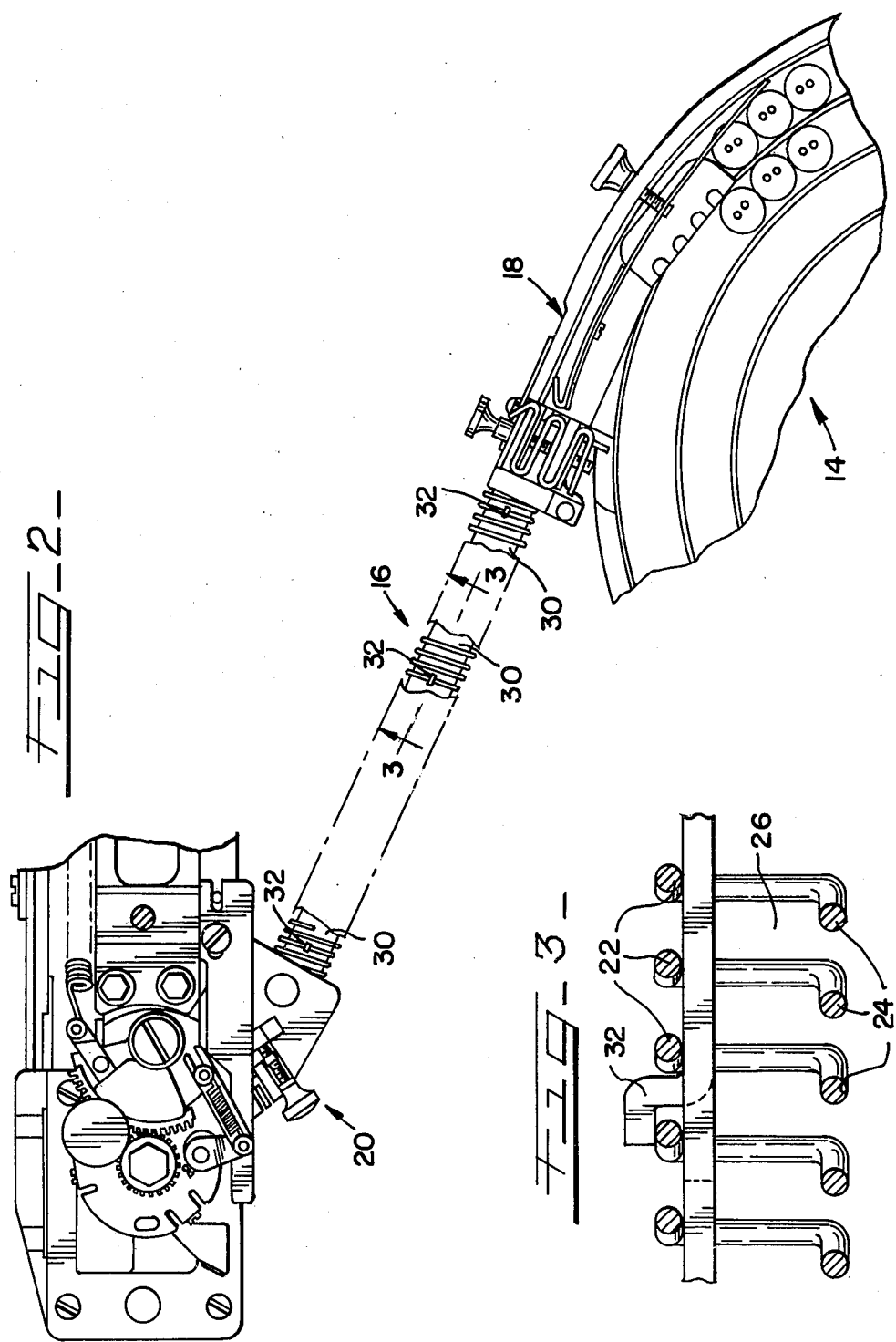

APPARATUS FOR DELIVERING DISK-LIKE OBJECTS TO AN ATTACHING STATION

FIELD OF THE INVENTION

This invention relates to sewing machines and more particularly to an improved means for delivering buttons from a vibratory reservoir to a button sewing machine.

BACKGROUND OF THE INVENTION

Versatility in today's sewing industry is no longer a goal, instead, it is a requirement. This is especially true when considering button sewing. Because of today's constantly changing patterns, the sewing station must be versatile enough to enable a quick change over from one type of button to another. To enable this quick change over process in button sewing operations, some manufacturers have moved away from conventional hardware type button delivery means and are using spring type chutes for conveying buttons or other disk-like objects from a vibratory reservoir to the sewing station of the machine. One concern with spring type chutes is that as the buttons vibrationally gravitate toward the machine they have a tendency to "ride up" on each other resulting in a jam-up and, ultimately, creating interruption of the machine operation. To counter this problem, manufacturers have provided close to one hundred tracks for different diameters and thicknesses of buttons. Thus, one can select the appropriately sized track for the button being sewn and hopefully avoid this jam-up problem. Each chute or track, however, also requires different mounting brackets at each of its ends. Although effective, the cost considerations of this approach has led to the present invention.

BRIEF SUMMARY OF THE PRESENT INVENTION

In view of the above and in accordance with the present invention, there is provided a unique means which greatly reduces the number of tracks or chutes required while assuring uniform planar orientation of the button during its delivery from the vibratory hopper to the sewing machine. With the present invention, an elongated generally planar resilient member is inserted inside of the track and is mounted to remain in a generally parallel relationship therewith. The spacer extends substantially the length of the track and, thus, assures a constant planar orientation of the disk-like objects as they travel along the delivery path. The insertion of the spacer varys the track spacing thus allowing one spring type track to be used for multiple purposes. A plurality of upstruck, L-shaped tabs secure the spacer to the track.

It is therefore among the principal objects of this invention to provide a button guide track assembly which lends itself to today's varied applications at considerably lower costs then heretofore known.

Another object of this invention is the provision of a button guide tube track assembly which may be readily and conveniently adapted for use with a variety of button thicknesses with a minimum of part changes.

Another feature of the present invention is its ready adaptability to existing units currently in wide use.

Still a further object of this invention is the provision of a guide attachment which readily lends itself to multiple applications at a minimal price.

Yet another advantage of this invention is the practical elimination of machine downtime resulting from jammed button guide chutes.

Another object of this invention is the provision of a guide tube assembly which can be utilized to assure proper orientation of the button during its delivery from the supply source to the machine.

These objects and features, as well as other incidental ends and advantages, will become apparent from the description now to follow of the preferred embodiment shown by way of example in the accompanying drawings in which:

FIG. 1 is a side elevational view of a sewing station incorporating the present invention;

FIG. 2 is a fragmentary plan view of the present invention;

FIG. 3 is a sectional view taken along Line 3—3 of FIG. 2.

DESCRIPTION OF THE PREFERRED EMBODIMENT

Referring now more particularly to the drawings, wherein like reference numerals indicate like parts throughout the views, there is shown in FIG. 1, a button sewing station adapted to attach buttons or other disk-like objects to a material workpiece. A sewing machine 10, provided with reciprocal needle means 12 defining a sewing zone or area, is adapted to affect the attaching operation in a well known manner. The sewing machine may be of the type disclosed in the U.S. Pat. No. 3,960,094 granted June 1, 1976 to J. C. Hsiao and incorporated herein by reference. Associated with the sewing machine is a vibratory bowl or button reservoir 14. Such vibratory bowl may be purchased from the F.M.C. Corporation under Model EB00E. Suffice it to say, the bowl is adapted to hold and seriatimly feed buttons. As seen in FIG. 2, a button guide chute assembly 16 comprised of an open ended spring type track is positioned intermediate the discharge opening 18 of the supply reservoir and the machine for delivering buttons to the receiving station, generally designated 20, of the machine.

The essence of the present invention lies in an improvement to the button guide or chute assembly 16 which intergrally aides the operation of the attaching machine. As mentioned, the button guide tube or conveyor is preferably a spring type, resilient design. As seen in FIG. 3, the conveyor has parallel, spaced apart top section means 22 and bottom section means 24 defining a guideway 26 along which the buttons gravitationally move from the vibratory bowl to the machine receiving station. The space between the top and button section means is dimensionally greater in height than the thickness of the button received from the vibratory hopper.

To economize on the number of chutes required for efficient operation of a machine of this sorts, the present invention provides a unique means which allows one chute to be used for a plurality of button thicknesses while concurrently preventing the buttons or disk-like objects from riding on top of one another thus eliminating jam-up which, ultimately, would cause interruption of the machine operation. Such unique means include an elongated, generally planar, resilient spacer member 30 adapted for insertion inside of the track for altering the space constraints of the delivery path as a function of button thickness. More importantly, the implant or insert means serves to maintain the disk-like objects in the same planar orientation as when they are initially delivered to the spring type track from the vibratory hopper. Because the insert means extend substantially the length of the button guideway, a constant planar orientation of the gravitationally fed objects may be maintained during their delivery to the machine.

As shown in FIG. 3, the insert means may be provided with a plurality of upstruck, generally L-shaped tabs 32. The L-shaped tabs are spaced at intervals along the length of the spacer and each tab is adapted to engage a wire of the spring chute. At least two tabs at each end of the spring may have their openings in opposite directions.

In assembly, the spacer will be inserted into the guideway of the untensioned spring track assembly. In such condition, the spring track assembly is shorter than the spacer. The chute or spring track will be stretched to the length of the spacer such that the ends of the track are substantially contiguous with the ends of the spacer. Once stretched, a wire of the chute may be inserted into each of the tab openings at the ends of the spacer. The stretching of the chute will hold the spacer in a position extending generally parallel with the top and bottom section means of the chute. It is preferred that the spacer be operatively associated with the top section means of the chute. Thereafter, other spring chute wires may be inserted into the remaining tabs such that the spring pressure will keep the wires engaged in the tab openings. The spacer may be interchanged depending upon the particular button thickness being sewn. Thus, the spacer may eliminate extra chutes and mounting brackets. For each chute of a different width, covering a variety of button diameters, a spacer of a corresponding width may be provided.

Thus it is apparent that there has been provided, in accordance with the invention an Apparatus For Delivering Disk-Like Objects To An Attaching Station that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

Having thus adaquately described the invention, what I claim is:

1. A button sewing station comprising:
   a button hopper;
   a button sewing machine having a receiving station;
   a button chute disposed between said hopper and sewing machine, said chute having an open ended track defining a button delivery path, said track being heightwise dimensioned larger than the thickness of button being delivered to said button receiving station; and insertable means carried by said chute for restricting the heightwise dimension of said track thereby controlling the planar disposition of buttons as they travel along said track.

2. An apparatus for feeding disk-like objects to a machine, the apparatus comprising:
   a reservoir for storing and dispensing disk-like objects having generally common thicknesses;
   conveyor means adapted to receive the disk-like objects as they are dispensed from said reservoir, said conveyor having a guideway along which the disk-like objects gravitationally and vibrationally move toward the machine; and
   means insertable within said guideway for restricting the latter in accordance with the thickness of the object being moved.

3. In a spring type track used in conjunction with a button feeding device or similar structure, the improvement comprising:
   an elongated generally planar member adapted for insertion inside of said track and mounted to remain in a mutual parallel relationship therewith for changing the space constraints of said spring type track as a function of button thickness.

4. A button attaching means including in combination, reciprocal needle means defining a button attaching zone, a button reservoir for storing buttons having a generally common thickness, and a resilient chute defining a button delivery path between the button reservoir and the area of said button attaching zone, wherein the improvement comprises:
   resilient elongated insert means operatively associated with said chute for restricting the latter in accordance with the thickness of the button being attached thereby maintaining the planar orientation of said buttons constant as they travel along their button delivery path.

5. Apparatus for supplying disk-like objects to an attaching station of a machine comprising:
   a bowl for holding and feeding disk-like objects of generally common thicknesses;
   a chute disposed intermediate said bowl and machine, said chute having a guideway adapted to receive disk-like objects exiting from said bowl; and
   insert means operatively associated with said chute for sizing the guideway in accordance with the thickness of the object being supplied thereby maintaining the disk-like objects in a planar orientation during their delivery to the machine.

6. Apparatus for supplying buttons to a button sewing machine comprising:
   a bowl for holding and seriatimly feeding buttons;
   a spring type track disposed between said bowl and said button sewing machine, said track having a guideway which is greater in height than the thickness of button in said bowl and which is adapted to receive the buttons exiting from the bowl; and
   spacer means insertable into said guideway and extending along the substantial length of said spring type track for maintaining the buttons in the same planar orientation as when initially delivered to said spring type track.

7. A button sewing station comprising:
   a button attaching means;
   a button reservoir means;
   flexible spring track means disposed between said button attaching means and the button reservoir means, said spring track means having parallel spaced apart top and bottom section means shaped to define therebetween
   a chute for delivering buttons in a planar orientation and
   insert means disposed between said top and bottom section means of said track means to vary the spacing between the sections as a function of button thickness.

8. A button sewing station comprising:
   button attaching means;
   button reservoir means;

spring type chute means for gravitationally delivering buttons between said reservoir means and the attaching means, said chute having opposed top and bottom section means which are heightwise spaced apart to define a button delivery path; and interchangable implant means operatively associated with chute means for limiting the heightwise space constraints of said delivery path.

9. The invention according to claim 7 or 8 wherein said insert means is provided with means for holding the insert means adjacent the top section means of the track.

10. The invention according to claim 7 or 8 wherein said insert means is provided with a plurality of upstruck tabs adapted to engage the spring type chute to hold said insert means against the top section means of the track.

* * * * *